United States Patent
Moser et al.

(10) Patent No.: US 11,971,845 B2
(45) Date of Patent: Apr. 30, 2024

(54) DSP ENCAPSULATION

(71) Applicant: BAE Systems Information and Electronic Systems Integration Inc., Nashua, NH (US)

(72) Inventors: David D. Moser, Haymarket, VA (US); Christopher N. Peters, Nashua, NH (US); Daniel L. Stanley, Warrenton, VA (US); Umair Aslam, Dumfries, VA (US); Elizabeth J. Williams, Bristow, VA (US); Angelica Sunga, Arlington, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 89 days.

(21) Appl. No.: 17/841,720

(22) Filed: Jun. 16, 2022

(65) Prior Publication Data

US 2023/0409517 A1    Dec. 21, 2023

(51) Int. Cl.
*G06F 15/78* (2006.01)
*G06F 13/16* (2006.01)
*G06F 13/38* (2006.01)
*G06F 13/42* (2006.01)

(52) U.S. Cl.
CPC ...... *G06F 15/7817* (2013.01); *G06F 13/1668* (2013.01); *G06F 13/385* (2013.01); *G06F 13/4226* (2013.01); *G06F 15/7871* (2013.01)

(58) Field of Classification Search
None
See application file for complete search history.

(56) References Cited

U.S. PATENT DOCUMENTS

| 8,659,318 B1* | 2/2014 | Gordon ............ H03M 5/18 326/82 |
| 11,169,945 B1* | 11/2021 | Wu ............ G06F 9/541 |
| 2006/0230094 A1 | 10/2006 | Simkins et al. |
| 2015/0120978 A1* | 4/2015 | Kalyanasundharam ............ G06F 12/1009 710/267 |
| 2018/0307619 A1 | 10/2018 | Kalyanasundharam et al. |
| 2019/0028387 A1 | 1/2019 | Gray |

(Continued)

OTHER PUBLICATIONS

International Search Report, PCT/US23/23594, dated Aug. 14, 2023, 9 pages.

*Primary Examiner* — Henry Tsai
*Assistant Examiner* — Aurangzeb Hassan
(74) *Attorney, Agent, or Firm* — Sand, Sebolt & Wernow LPA; Gary McFaline (57) ABSTRACT

An encapsulation block for a digital signal processing (DSP) block. The encapsulation block includes DSP block having an input terminal, an output terminal, and an input clock. The encapsulation block also includes pacing control network operatively connected with the input terminal, the output terminal, and the input clock of the DSP block. The input terminal of the DSP block is configured to receive a samples-in data stream inputted at a predefined clock period defined by the input clock. The output terminal of the DSP block is configured to receive a samples-out data stream outputted at a predefined paced parameter. The pacing control network is configured to control data flow at the samples-in data stream and the samples-out data stream independently of the DSP block.

16 Claims, 5 Drawing Sheets

(56) References Cited

U.S. PATENT DOCUMENTS

| | | | |
|---|---|---|---|
| 2019/0096813 A1* | 3/2019 | Lesea | H01L 23/50 |
| 2019/0339684 A1 | 11/2019 | Cella et al. | |
| 2020/0212943 A1* | 7/2020 | Banin | H04L 7/0331 |
| 2021/0021925 A1* | 1/2021 | Zheng | H04R 1/406 |
| 2021/0185440 A1 | 6/2021 | Mackay et al. | |
| 2021/0194724 A1* | 6/2021 | Lee | H04J 14/0283 |
| 2022/0050582 A1* | 2/2022 | Zhou | H04L 51/52 |
| 2022/0407558 A1* | 12/2022 | Spence | H04B 1/48 |

* cited by examiner

DSP ENCAPSULATION

TECHNICAL FIELD

The present disclosure generally relates to digital signal processing ("DSP") circuitry. More particularly, the present disclosure relates to encapsulating preconfigured DSP blocks for modularly reconfiguring into different logical applications. Specifically, the present disclosure relates to encapsulating preconfigured DSP blocks with pacing control networks where the preconfigured DSP blocks are leveraged and reconfigured into different logical applications.

BACKGROUND

Digital signal processing ("DSP") circuits are used to process signals in discrete mathematical sequences of numbers. These DSP circuits provide discrete mathematical sequences of numbers by analyzing, modifying, and/or extracting the information contained in the signals by carrying out logical operations and processing on the signals. These DSP circuits are also utilized in different applications for processing signals, including telecommunication, instrumentation and control, digital image processing, speech processing, medical applications, signal filtering, military applications, consumer electronics, and other various applications for processing signals of the like. Generally, these DSP circuits include numerous DSP units and/or blocks that apply different types of logical operations and processing of signals in a single integrated circuit.

While these DSP circuits are used in numerous applications, these DSP circuits are built to a permanent, preconfigured application. The DSP blocks integrated into these DSP circuits only serve a single purpose or application based on the preconfigured application. For example, these DSP blocks are preconfigured with permanent parameters such as permanent samples-in format, permanent samples-out format, inputting data at permanent cycles, and pacing at a permanent input clock integrated into each DSP block. Moreover, the data that is outputted from these DSP blocks are usually validated in a preconfigured paced manner without the use of flow control signals.

To combat these issues, designers of these DSP circuits may only design new DSP blocks for DSP circuits for another permanent, preconfigured application. As such, the previous DSP blocks in preconfigured DSP circuits are not configurable to be modified and/or manipulated for another purpose outside of the original preconfigured application.

SUMMARY

The presently disclosed encapsulation blocks encapsulating preconfigured DSP blocks with pacing control networks provide designers of these systems with the modularity and reconfiguration of preconfigured DSP blocks into new and different applications. The disclosed encapsulation blocks provide designers with the capability of leveraging and reusing the preconfigured DSP blocks into a new application and/or program via the encapsulation blocks. The disclosed encapsulation blocks also provide designers with the capability of integrating the preconfigured DSP blocks into different types of streaming protocols available. The disclosed encapsulation blocks also provide designers with the capability of allowing each preconfigured DSP block to communicate with one or more preconfigured DSP block in a DSP circuit. As such, the encapsulation blocks disclosed herein addresses some of the inadequacies of previously known techniques and uses of preconfigured DSP circuits.

In one aspect, an exemplary embodiment of the present disclosure may provide a system. The system includes a digital signal processing (DSP) block having an input terminal, an output terminal, and an input clock. The system also includes a pacing control network operatively connected with the input terminal, the output and the input clock of the DSP block. The system also includes that the input terminal of the DSP block is configured to receive a samples-in data stream inputted at a predefined clock period defined by the input clock. The system also includes that the output terminal of the DSP block is configured to receive a samples-out data stream outputted at a predefined paced parameter. The system also includes that the pacing control network is configured to control data flow at the samples-in data stream and the samples-out data stream independently of the DSP block.

This exemplary embodiment or another exemplary embodiment may further include that the pacing control network comprises: a pacing control block operatively connected with the input terminal, the output terminal, and the input clock of the DSP block; wherein the pacing control block is operable to control the input clock of the DSP block dependent upon input data being sent along the samples-in data stream. This exemplary embodiment or another exemplary embodiment may further include that the pacing control network further comprises: a streaming-in gasket operatively connected with the pacing control block; and a stream-in connection operatively connected with the streaming-in gasket; wherein the streaming-in gasket is configured to transmit a signal indicative of whether data is being inputted from the stream-in connection. This exemplary embodiment or another exemplary embodiment may further include that the pacing control network is adapted to set the input clock of the DSP block, via a data validation protocol, between an activated state and a deactivated state in response to data being available at the streaming-in gasket. This exemplary embodiment or another exemplary embodiment may further include that when data is available at the streaming-in gasket, the pacing control network sets the input clock of the DSP block at the activated stated. This exemplary embodiment or another exemplary embodiment may further include that when data is unavailable at the streaming-in gasket, the pacing control network sets the input clock of the DSP block at the deactivated stated. This exemplary embodiment or another exemplary embodiment may further include that the pacing control network enables operation of the DSP block in response to receiving a pacing parameter key that matches with a predetermined pacing setting of the DSP block. This exemplary embodiment or another exemplary embodiment may further include that the pacing control network further comprise a streaming-out gasket operatively connected with the pacing control network; and a stream-out connection operatively connected with the streaming-out gasket and an output device. This exemplary embodiment or another exemplary embodiment may further include that the streaming-in gasket is configured to receive a set of inputs provided in a first protocol via the streaming-in connection; wherein the DSP block is configured to receive a set of encapsulated inputs provided in a second protocol outputted from the streaming-in gasket via a samples-in connection; wherein the streaming-out gasket is configured to receive a set of output data provided in the second protocol outputted from the DSP block via a samples-out connection; and wherein an output device is configured to receive a set of encapsulated output data provided in the first protocol outputted from the streaming-out gasket via the stream-out connection; wherein the first protocol and the second protocol are different. This exemplary embodiment or another exemplary embodiment may further include that each of the set of inputs and the set of outputs is receptive to a data-in-data-out streaming protocol. This exemplary embodiment or another exemplary embodiment may further include that each of the set of inputs and the set of outputs is receptive to an Advanced eXtenisble Interface (AXI) streaming protocol.

In another aspect, an exemplary embodiment of the present disclosure may provide a method. The method comprises steps of: inputting a set of input signals from an input signal device to a streaming-in gasket of a pacing control network, via a stream-in connection, operatively connected with a digital signal processing (DSP) block; determining whether to provide an input clock of the DSP Block in one of an activated state and a deactivated state via a pacing control block of the pacing control network; outputting a set of encapsulated input signals, via a samples-in connection, from the streaming-in gasket to the DSP Block; processing the set of encapsulated input signals into a set of outputted encapsulated data via the DSP block; outputting a set of output data, via a samples-out connection, from the DSP block to a streaming-out gasket of the pacing control network; and outputting a set of encapsulated output data, via a stream-out connection, from the streaming-out gasket.

This exemplary embodiment or another exemplary embodiment may further include a step of may include setting the input clock of the DSP block to the activated state, via the pacing control block, when the set of input signals is available at the streaming-in gasket. This exemplary embodiment or another exemplary embodiment may further include a step of setting the input clock of the DSP block to the deactivated state, via the pacing control block, when the set of input signals is unavailable at the streaming-in gasket. This exemplary embodiment or another exemplary embodiment may further include a step of enabling operation of the pacing control network and the DSP block in response to a pacing parameter key logically inputted into the pacing control block. This exemplary embodiment or another exemplary embodiment may further include steps of morphing the set of input signals from a first protocol into the set of encapsulated input signals at a second protocol; and morphing the set of output data from the second protocol to the set of encapsulated output data to the first protocol; wherein the first protocol and the second protocol are different from one another. This exemplary embodiment or another exemplary embodiment may further include a step of operatively connecting the pacing control network and the DSP block with a bus having an Advanced eXtenisble Interface (AXI) streaming protocol.

In yet another aspect, an exemplary embodiment of the present disclosure may provide an encapsulation block for a digital signal processing (DSP) block. The encapsulation block includes a streaming-in gasket operatively connected with an input terminal of a DSP block. The encapsulation block also includes a streaming-out gasket operatively connected with an output terminal of the DSP block. The encapsulation block also includes a pacing control block operatively connected with the streaming-in gasket, the streaming-out gasket, and an input clock of a DSP block. The pacing control block is configured to control flow of data inputted into the DSP Block and outputted from the DSP block via the streaming-in gasket and the streaming-out gasket.

This exemplary embodiment or another exemplary embodiment may further include that the pacing control block is configured to control the input clock of the DSP block based on availability of data in the streaming-in gasket. This exemplary embodiment or another exemplary embodiment may further include a stream-in connection operatively connected with the streaming-in gasket; and a stream-out connection operatively connected with the streaming-out gasket; wherein the encapsulation block operatively connects with a bus having an Advanced eXtenisble Interface (AXI) streaming protocol via the stream-in connection and the stream-out connection.

In yet another aspect, an exemplary embodiment of the present disclosure may provide a system. The system includes a plurality of encapsulation blocks having a plurality of digital signal processing (DSP) blocks provided with preconfigured logic functions and a plurality of pacing control networks operatively connected with the plurality of DSP blocks. The system also includes a streaming cross bar operatively connected with each encapsulation block of the plurality of encapsulation blocks. Each encapsulation block of the plurality of encapsulation blocks includes a DSP block of the plurality of DSP blocks and a pacing control network of the plurality of the pacing control networks. Each DSP block of the plurality of DSP blocks is independently and separately connected with the streaming cross bar via the plurality of pacing control networks.

This exemplary embodiment or another exemplary embodiment may further include that wherein each pacing control network of the plurality of pacing control networks is independent from the preconfigured logic function of each DSP block of the plurality of DSP block; and wherein the plurality of pacing control networks enables each DSP block of the plurality of DSP blocks to communicate with one another in one of a sequential order or a non-sequential order via the streaming cross bar. This exemplary embodiment or another exemplary embodiment may further include that wherein the streaming cross bar is configured to enable communication between each DSP block of the plurality of DSP blocks via the respective pacing control network of the plurality of pacing control networks. This exemplary embodiment or another exemplary embodiment may further include at least one DSP block of the plurality of DSP blocks having a first preconfigured logic function; and at least another DSP block of the plurality of DSP blocks having a second preconfigured logic function different than the first preconfigured logic function; wherein the at least one DSP block and the at least another DSP block communicate with one another via at least one pacing control network of at least one encapsulation block, at least another pacing control network of at least another encapsulation block, and the streaming cross bar. This exemplary embodiment or another exemplary embodiment may further include at least one DSP block of at least one encapsulation block having a first security level; and at least another DSP block of at least another encapsulation block having a second security level that is different than the first security level of the at least one DSP block; wherein the at least one DSP block and the at least another DSP block are adapted to be reconfigured separately and independently of one another. This exemplary embodiment or another exemplary embodiment may further include that each pacing control network of the plurality of pacing control networks is configured to enable operation of a desired DSP block from the plurality of DSP blocks in response to receiving a pacing parameter key matching a predetermined pacing setting of the desired DSP block. This exemplary embodiment or another exemplary embodiment may further include a plurality of streaming connections operatively connecting the plurality of pacing control networks with the streaming cross bar; wherein the plurality of streaming connections enables each DSP block of the plurality of DSP blocks to communicate with one another via the streaming cross bar. This exemplary embodiment or another exemplary embodiment may further include that the plurality of pacing control networks and the streaming cross bar utilize a data-in-data-out streaming protocol. This exemplary embodiment or another exemplary embodiment may further include that the plurality of pacing control networks and the streaming cross bar utilize an Advanced eXtenisble Interface (AXI) streaming protocol. This exemplary embodiment or another exemplary embodiment may further include that the system is provided on an application-specific integrated circuit (ASIC). This exemplary embodiment or another exemplary embodiment may further include that each pacing control network of the plurality of pacing control networks further comprises: a streaming-in gasket operatively connected with an input terminal of a DSP block of the plurality of DSP blocks; a streaming-out gasket operatively connected with an output terminal of the DSP block of the plurality of DSP blocks; and a pacing control block operatively connected with the streaming-in gasket, the streaming-out gasket, and an input clock of a DSP block; wherein the pacing control block is configured to control flow of data inputted into the DSP Block of the plurality of DSP blocks and outputted from the DSP block of the plurality of DSP blocks via the streaming-in gasket and the streaming-out gasket. This exemplary embodiment or another exemplary embodiment may further include that the pacing control block is configured to activate the input clock of the DSP block to an ON state when data is available at the streaming-in gasket; and wherein the pacing control block is configured to activate the input clock of the DSP block to an OFF state when data is unavailable at the streaming-in gasket. This exemplary embodiment or another exemplary embodiment may further include a stream-in connection operatively connected with the streaming-in gasket; and a stream-out connection operatively connected with the streaming-out gasket; and a bus, having an Advanced eXtensible Interface (AXI) protocol, operatively connecting the encapsulation block with the stream-in and stream-out connections.

In yet another aspect, an exemplary embodiment of the present disclosure may provide a method. The method includes steps of providing a plurality of digital signal processing (DSP) blocks with preconfigured logic functions; encapsulating each DSP block of the plurality of DSP blocks with a respective pacing control network of a plurality of pacing control networks independently of the preconfigured logic functions of the plurality of DSP blocks; and connecting the plurality of pacing control networks, via a plurality of streaming connections, to a streaming cross bar, wherein each DSP block of the plurality of DSP block is independently and separately connected with the streaming cross bar via the plurality of pacing control networks.

This exemplary embodiment or another exemplary embodiment may further include steps of effecting a first set of outputs to be sent, via at least one DSP block of the plurality of DSP blocks, over a first streaming connection of the plurality of streaming connections to the streaming cross bar; and effecting the first set of outputs to be received via at least another DSP block of the plurality of DSP blocks, wherein the at least one DSP block and the at least another DSP block is provided in a non-sequential order. This exemplary embodiment or another exemplary embodiment may further include steps of providing at least one DSP block of the plurality of DSP blocks with a first preconfigured logic function; providing at least another DSP block of the plurality of DSP blocks with a second preconfigured logic function different than the first preconfigured logic function; and enabling the at least one DSP block and the at least another DSP block to communication with one another via the plurality of pacing control networks and the streaming cross bar. This exemplary embodiment or another exemplary embodiment may further include steps of providing at least one DSP block of the plurality of DSP blocks with a first security level; and providing at least another DSP block of the plurality of DSP blocks with a second security level that is different than the first security level of the at least one DSP block, wherein the at least one DSP block and the at least another DSP block are adapted to be reconfigured separately and independently. This exemplary embodiment or another exemplary embodiment may further include a step of enabling function, via a pacing parameter key, between a DSP block of the plurality of DSP blocks with a respective pacing function network of the plurality of pacing function networks. This exemplary embodiment or another exemplary embodiment may further include steps of effecting a set of input signals to be input from an input signal device to a first streaming-in gasket of a first pacing control block of the plurality of pacing control network, via a stream-in connection, operatively connected with a first DSP block of the plurality of DSP blocks; effecting to determine whether to provide an input clock of the first DSP Block in one of the ON state and the OFF state via the first pacing control block of the plurality of pacing control network; effecting a set of encapsulated input signals to be output, via a samples-in data stream, from the first streaming-in gasket to the first DSP Block; effecting the set of encapsulated input signals to be processed into a set of outputted encapsulated data via the first DSP block; effecting a set of output data to be output, via a samples-out data stream, from the first DSP block to a first streaming-out gasket of the first pacing control network; and effecting a set of encapsulated output data to be output, via a stream-out connection, from the first streaming-out gasket to a second DSP block of the plurality of DSP blocks. This exemplary embodiment or another exemplary embodiment may further include a step of providing the plurality of DSP blocks, the plurality of pacing control networks, and the streaming cross bar on an application-specific integrated circuit (ASIC).

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
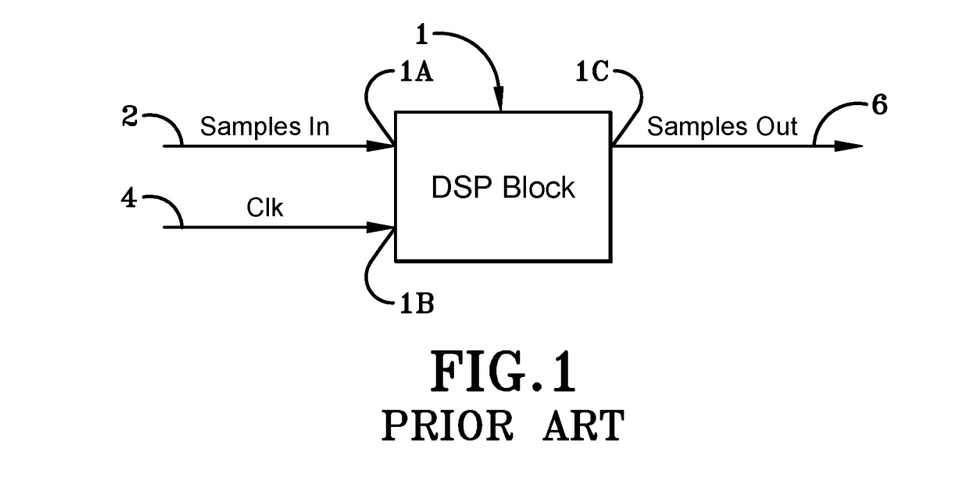
FIG. 1 is a block diagram of a PRIOR ART digital signal processing (DSP) block.

FIG. 1 illustrates a PRIOR ART digital signal processing (DSP) block that is generally referred to as 1. The PRIOR ART DSP block 1 is a conventional DSP block that is capable of representing signals in a discrete mathematical sequence of numbers. Additionally, the PRIOR ART DSP block 1 is also capable of analyzing, modifying, and/or extracting the information in a given signal by carrying out logical operations and processing on the given signal. Generally, these PRIOR ART DSP blocks 1 are preconfigured with specific logical operations to analyze, modify, and/or extract the information in a given signal for processing needs.

Still referring to FIG. 1, the PRIOR ART DSP block 1 includes a first input terminal 1A, a second input terminal 1B, and an output terminal 1C. A samples-in connection 2 is operatively connected with the first input terminal 1A of the PRIOR ART DSP block 1. The samples-in connection 2 enables signals to be outputted from at least one signal generating device (not illustrated) to the PRIOR ART DSP block 1 for analyzing, modifying, and/or extracting the information in the signals via the preconfigured logical operations provided in the PRIOR ART DSP block 1. An input clock 4 is also operatively connected with the second input terminal 1B of the PRIOR ART DSP block 1. The input clock 4 enables the PRIOR ART DSP block 1 to output data at a predetermined latency and at a predetermined decimation rate via the preconfigured logical operations provided in the PRIOR ART DSP block 1. A samples-out connection 6 is also operatively connected with the output terminal 1C of the PRIOR ART DSP block 1. The samples-out connection 6 enables the PRIOR ART DSP BLOCK 1 to output the analyzed, modified, and/or extracted data to an output device (not illustrated) or to another PRIOR ART DSP block, which described in more detail below.

Figure 2:
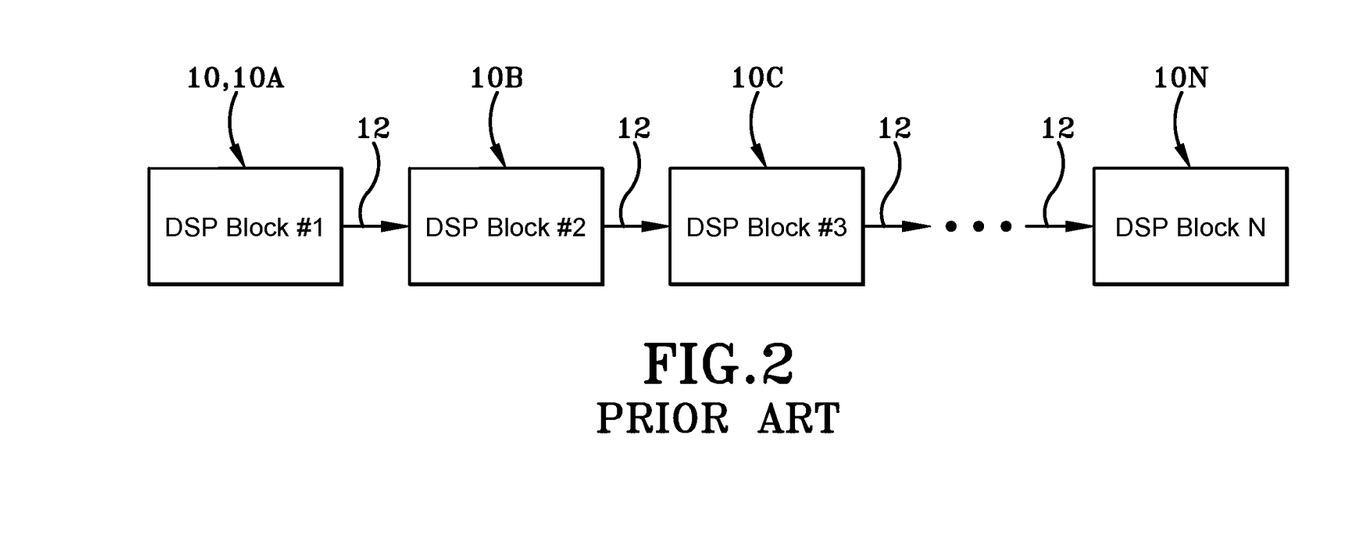
FIG. 2 is a block diagram of a PRIOR ART DSP block series.

FIG. 2 illustrates a PRIOR ART DSP block series 10 that includes a plurality of PRIOR ART DSP blocks 10 interconnected with one another in a preconfigured, sequential order. The PRIOR ART DSP block series 10 includes a finite number of PRIOR ART DSP blocks 10 operatively connected in a preconfigured, sequential order. As illustrated in FIG. 2, the PRIOR ART DSP block series 10 includes a first PRIOR ART DSP block 10A, a second PRIOR ART DSP block 10B in series with and subsequent to the first PRIOR ART DSP block 10A, a third PRIOR ART DSP block 10C in series with and subsequent to the first and second PRIOR ART DSP blocks 10A, 10B, and a finite number of PRIOR ART DSP block 10N in series with and subsequent to the first, second, and third PRIOR ART DSP blocks 10A, 10B, 10C.

As illustrated in FIG. 2, the PRIOR ART DSP block series 10 is provided in a preconfigured sequence that remains permanent when constructed. In other words, the configuration and functionality of the PRIOR ART DSP block series 10 at build time prevents any one of the PRIOR ART blocks 10A, 10B, 10C, 10N from being reconfigurable in the PRIOR ART DSP block series 10. As such, these PRIOR ART DSP block series 10 remains fixed to a specific functionality that is designed not to be changed and/or modified outside of the original function during the building and/or construction of these PRIOR ART DSP block series 10.

Figure 3:
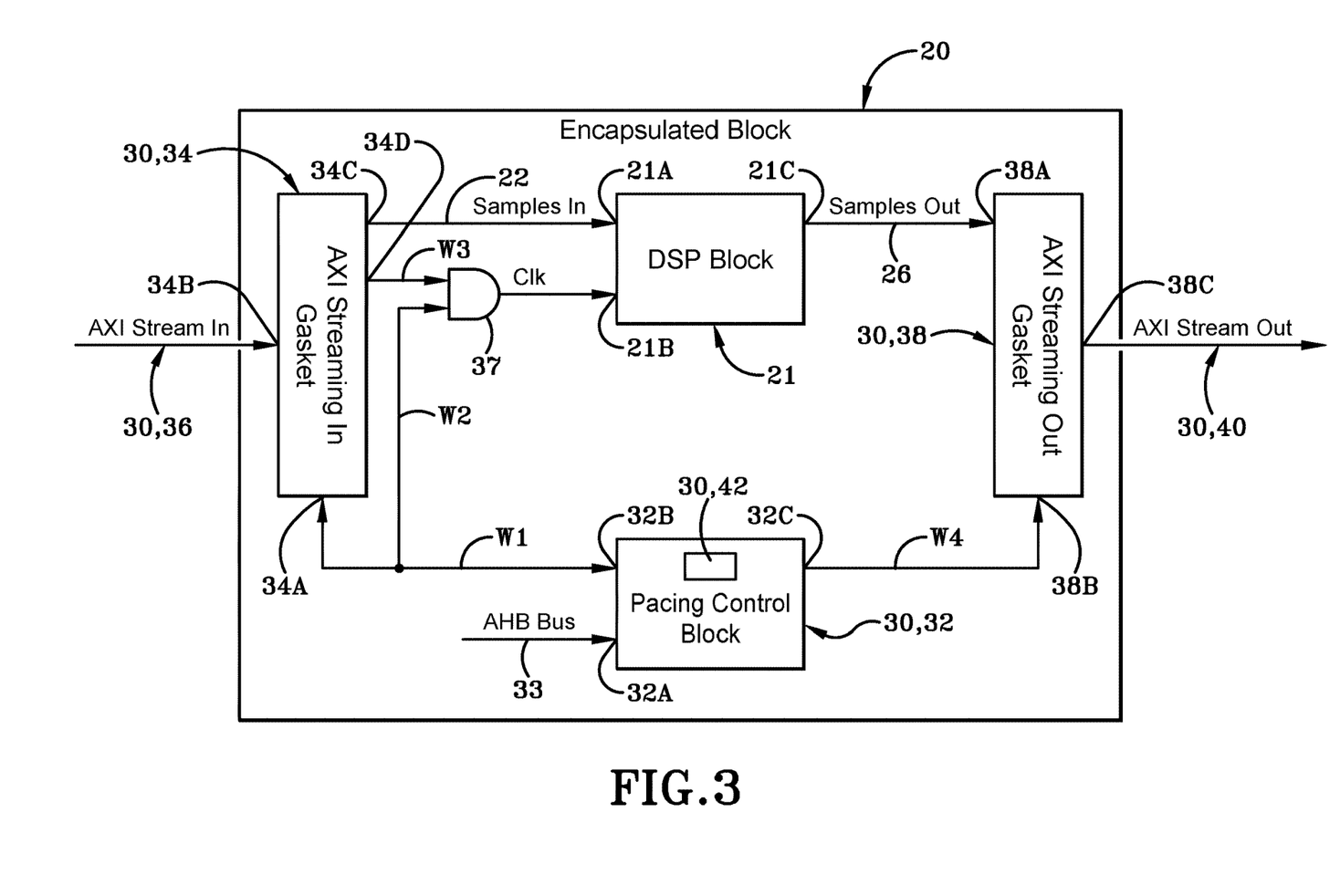
FIG. 3 is a block diagram of a DSP block with a modular encapsulation block in accordance with one aspect of the present disclosure.

FIG. 3 illustrates an encapsulation block 20 of the present disclosure that includes a conventional DSP block 21 similar to the PRIOR ART DSP BLOCK 1. The DSP block 21 includes a first input terminal 21A, a second input terminal 21B, and an output terminal 21C. A samples-in connection or stream 22 is operatively connected with the first input terminal 21A of the DSP block 21. The samples-in connection 22 enables signals to be outputted from at least one signal generating device to the DSP block 21 for analyzing, modifying, and/or extracting the information in the signals via the preconfigured logical operations provided in the DSP block 21. An input clock "Clk" is also operatively connected with the second input terminal 21B of the DSP block 21. The input clock "Clk" enables the DSP block 21 to output data at a predetermined latency and at a predetermined decimation rate via the preconfigured logical operations provided in the DSP block 21. A samples-out connection or stream 26 is also operatively connected with the output terminal 21C of the DSP block 21. The samples-out connection 26 enables the DSP block 21 to output the analyzed, modified, and/or extracted data to an output device or to another DSP block, which described in more detail below.

Still referring to FIG. 3, the DSP block 21 is encapsulated with a modular pacing control network 30. The modular pacing control network 30 enables a designer of these types of systems with the ability to repurpose and/or leverage preconfigured DSP blocks (like DSP block 21) into a new system. In other words, the modular pacing control network 30 provides a designer of these types of systems with the modularity to reuse preconfigured DSP blocks (like DSP block 21) in a different system and/or network outside of the legacy system of these preconfigured DSP blocks. Moreover, the pacing control network 30 is provided with a data-in-data-out (DIDO) streaming protocol to allow modularity of the preconfigured DSP blocks 21 into different applications. Specifically, the pacing control network 30 is provided with an Advanced eXtenisble Interface (hereinafter "AXI") streaming protocol to allow modularity of the preconfigured DSP blocks 21 into different applications useable with AXI streaming protocols.

Still referring to FIG. 3, the pacing control network 30 includes a pacing control block 32 operatively connected with the DSP block 21. The pacing control block 32 includes an input terminal 32A, a first output terminal 32B, and a second output terminal 32C; such uses and purposes for these terminals 32A, 32B, 32C are described in more detail below. As described in more detail below, the pacing control block 32 is configured to control the input clock "Clk" of the DSP block 21 between an ON or activated state and an OFF or deactivated state based on signal data and information detected by the pacing control network 30 prior to being inputted into the DSP block 21.

Still referring to FIG. 3, an advanced high-performance bus 33 (hereinafter "AHB") is operatively connected with pacing control block 32. Specifically, the AHB 33 operatively connects with the input terminal 32A of the pacing control block 32 via an electrical connection. As provided herein, the AHB 33 is provided with an Advanced eXtenisble Interface (hereinafter "AXI") bus protocol. The AHB 33 is configured to facilitate and manage the pacing control block 32 with the DSP block 21 for enabling the DSP block 21 to be modular, which is also described in more detail below.

Still referring to FIG. 3, the pacing control network 30 includes a streaming-in gasket 34. The streaming-in gasket 34 includes a first input terminal 34A, a second input terminal 34B, a first output terminal 34C, and a second output terminal 34D. In the illustrated embodiment, the streaming-in gasket 34 operatively engages with the pacing control block 32 via the first electrical connection W1. Specifically, the first input terminal 34A of the streaming-in gasket 34 operatively connects with the first output terminal 32B of the pacing control block 32 via the first electrical connection W1. The streaming-in gasket 34 also operatively engages with an input signal device (not illustrated) via a streaming-in connection 36. Specifically, the second input terminal 34B of the streaming-in gasket 34 operatively connects with the input signal device via the streaming-in connection 36.

Still referring to FIG. 3, the streaming-in gasket 34 also operatively engages with the DSP block 21 via the samples-in stream 22. Specifically, the first output terminal 34C of the streaming-in gasket 34 operatively engages with the first input terminal 21A of the DSP block 21 via the samples-in stream 22.

Still referring to FIG. 3, the pacing control network 30 includes a gate 37. The gate 37 includes a first input terminal 37A (not shown), a second input terminal 37B (not shown), and an output terminal 37C (not shown). In the illustrated embodiment, the gate 37 operatively connects with the pacing control block 32 via a second electrical connection W2. Specifically, the first output terminal 32B of the pacing control block 32 operatively engages with the first input terminal 37A of the gate 37 via the second electrical connection W2. The gate 37 also operatively connects with the streaming-in gasket 34 via a third electrical connection W3. Specifically, the second output terminal 34D of the streaming-in gasket 34 operatively engages with the at least one input terminal 37A of the gate 37 via the third electrical connection W3. Still referring to FIG. 3, the gate 37 also operatively engages with the input clock "Clk" of the DSP block 21 via the at least one output terminal 37B of the gate 37.

As described in more detail below, the streaming-in gasket 34 is configured to monitor and detect when at least one input signal is available at the streaming-in gasket 34 when outputted by the input signal device. With this configuration of the streaming-in gasket 34, the connection between the pacing control block 32, the streaming-in gasket 34, and the gate 37 enables the pacing control block 32 to control the input clock "Clk" of the DSP block 21 between the ON state and OFF state, via the gate 37, for allowing operation of the DSP block 21 and for restricting operation of the DSP block 21. In one instance, the pacing control block 32 may provide the input clock "Clk" of the DSP block 21 at the ON state, via the gate 37, when the streaming-in gasket 34 detects at least one input signal available at the streaming-in gasket 34. In this instance, the input clock "Clk" assists the DSP block 21 for analyzing, modifying, and/or extracting the information in a given signal where the DSP block 21 carries out logical operations and processing on the given signal. In another instance, the pacing control block 32 may provide the input clock "Clk" of the DSP block 21 at the OFF state, via the gate 37, when the streaming-in gasket 34 detects at least one input signal is unavailable at the streaming-in gasket 34. In this instance, the DSP block 21 is maintained and/or frozen at the last time interval when at least one input signal was available at the streaming-in gasket 34. During operation, the pacing control block 32 may continuously activate the input clock "Clk" between the ON state and the OFF state, via the gate 37, dependent upon the availability of at least one input signal detected at the streaming-in gasket 34.

Still referring to FIG. 3, the pacing control network 30 also includes a streaming-out gasket 38. The streaming-out gasket 38 includes a first input terminal 38A, a second input terminal 38B, and an output terminal 38C. As illustrated in FIG. 3, the streaming-out gasket 38 operatively connects with the DSP 21 via the samples-out stream 26. Specifically, the first input terminal 38A of the streaming-out gasket 38 operatively connects with the output terminal 21C of the DSP block 21 via the samples-out stream 26.

Still referring to FIG. 3, the streaming-out gasket 38 also operatively connects with the pacing control block 32 via a fourth electrical connection W4. Specifically, the second input terminal 38B of the streaming-out gasket 38 operatively connects with the second output terminal 32C of the pacing control block 32 via the fourth electrical connection W4.

Still referring to FIG. 3, the streaming-out gasket 38 also operatively connects with an output device and/or bus via a streaming-out connection 40. Specifically, the output terminal 38C of the streaming-in gasket 34 operatively connects with the output device and/or bus via the streaming-out connection 40.

The streaming-in gasket 34 and the streaming-out gasket 38 of the pacing control network 30, as referred to in FIG. 3, are configured to morph signals inputted into the encapsulation block 20 and outputted from the encapsulation block 20 without reconfiguring or modifying the preconfigured and/or legacy programs of the DSP block 21. As such, the streaming-in gasket 34 is configured to morph the input signal provided in a first streaming protocol into a second streaming protocol prior to being outputted to the DSP block 21 via the samples-in stream 22. The streaming-out gasket 38 is configured to morph and revert the output data provided in the second streaming protocol back into the first streaming protocol subsequent to be outputted from the DSP block 21 via the samples-out stream 26. Such configuration of the streaming-in gasket 34 and the streaming-out gasket 38 allows the preconfigured DSP block 21 to be modular, via the encapsulation block 20, with other viable devices and components that may utilize the DSP block 21. In the illustrated embodiment, the streaming-in gasket 34 and the streaming-out gasket 38 are able to morph the data from and into AXI streaming protocol.

Still referring to FIG. 3, the pacing control network 30 is also configured to receive a pacing parameter key 42 via the AHB 33. The pacing parameter key 42 includes the specific preconfigured parameters of the DSP block 21 (e.g., latency rate, decimation rate, clock input rate, etc.) encapsulated by the pacing control network 30. As such, the pacing parameter key 42 allows the DSP block 21 and the pacing control block 32 to operate when the specific parameters are inputted into the pacing control block 32. The pacing parameter key 42 is considered advantageous at least because the pacing parameter key 42 provides security to prevent non-privy parties and/or users from using, copying, and/or modifying the pacing control network 30 of the encapsulation block 20.

Having now described the components and systems of the modular encapsulation block 20, a method of using the modular encapsulation block 20 is described in more detail below.

Upon operation, an input signal device sends at least one input signal to the encapsulation block 20 via the streaming-in connection 36. Upon receiving the at least one input signal, the at least one input signal is provided in a first streaming protocol (e.g., AXI streaming protocol) prior to be inputted to the streaming-in gasket 34. Once provided at the streaming-in gasket 34, the streaming-in gasket 34 is configured to morph and/or encapsulate the at least one input signal from the first streaming protocol into a second streaming protocol that is accepted by the DSP block 21. Once morphed, the streaming-in gasket 34 outputs the at least one input signal to the DSP block 21 via the samples-in stream 22.

Prior to morphing the at least one input signal from the first streaming protocol into the second streaming protocol, the streaming-in gasket 34 detects that the at least one input signal is available for the DSP block. This detection by the streaming-in gasket 34 is outputted to the pacing control block 32 via the first electrical connection W1. Once the detection is received by the pacing control block 32, the pacing control block 32 activates the input clock "Clk" of the DSP block 21, via the gate 37, to the ON state via the gate 37. Upon this activation, the input clock "Clk" allows the DSP block 21 to analyze, modify, and/or extract the information in a given signal by carrying out logical operations and processing on the given signal. The input clock "Clk" of the DSP block 21 may remain in the ON state until the streaming-in gasket 34 no longer detects an input signal from the input signal device. As such, the input clock "Clk" of the DSP block 21 may be activated between the ON state and the OFF state, via the gate 37, during operation of the encapsulation block 20.

Upon outputting the at least one input signal to the DSP block 21, the DSP block 21 analyzes, modifies, and/or extracts the information of the at least one input signal by carrying out the preconfigured logical operations and processing on the at least one input signal as shown in FIG. 3. Upon completion of the preconfigured logical operations, the DSP block 21 outputs a set of data at predefined parameters (e.g., predefined latency and predefined decimation rate) from the at least one input signal to the streaming-out gasket 38 via the samples-out stream 26. Once outputted by the DSP block 21, the streaming-out gasket 38 receives the set of data in the second streaming protocol. Upon receipt, the streaming-out gasket 38 morphs and reverts the set of data from the second streaming protocol to the first streaming protocol (e.g., AXI streaming protocol).

Upon the morphing of the set of data, the set of data is then outputted from the streaming-out gasket 38 to the streaming an output device via the streaming-out connection 40 as shown in FIG. 3. The output device may be any suitable device that is configured to receive the set of data analyzed, modified, and/or extracts by the DSP block 21. Moreover, the output device may be provided on an identical streaming protocol as the pacing control network 30.

Figure 4:
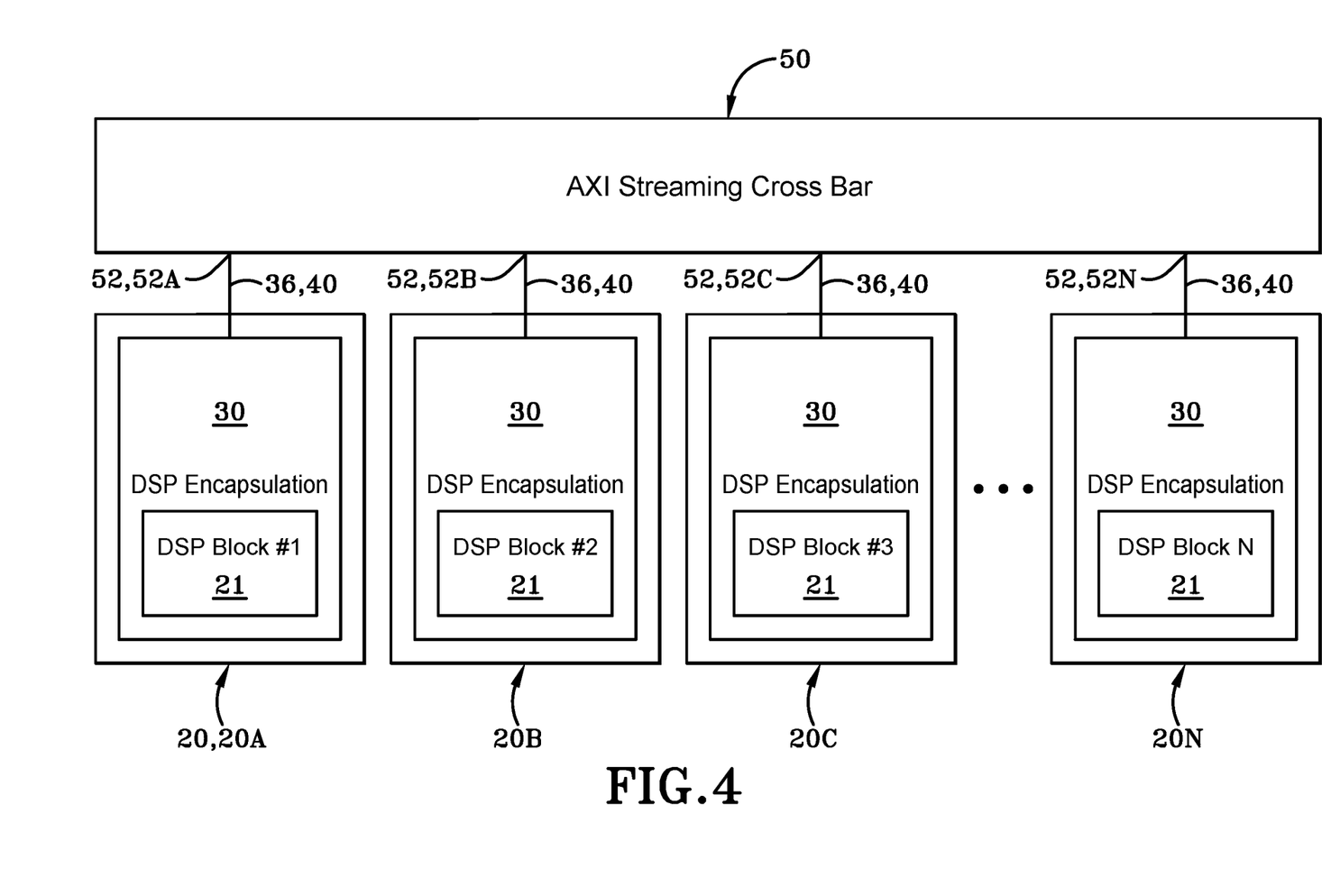
FIG. 4 is a block diagram of a system having a set of DSP block with a set of modular encapsulation blocks in accordance with one aspect of the present disclosure.

FIG. 4 illustrates a set of encapsulation blocks 20 where each encapsulation block of the set of encapsulation blocks 20 includes a DSP block 21 (as described above) operatively connected with a pacing control network 30 (as described above). The set of encapsulation blocks 20 is operatively connected with a streaming cross bar 50 where each encapsulation block of the set of encapsulation blocks 20 is independently and separately connected to the streaming cross bar 50, which is described in more detail below.

Referring to FIG. 4, the streaming cross bar 50 includes a set of terminals 52 for enabling the set of encapsulation blocks 20 to operatively connect with the streaming cross bar 50. As illustrated in FIG. 4, a first encapsulation block 20A of the set of encapsulation blocks 20 operatively connects with a first terminal 52A of the streaming cross bar 50 via the streaming-in and streaming-out connections 36, 40 of the pacing control network 30 associated with the first encapsulation block 20A. Similarly, second and third encapsulation blocks 20B, 20C of the set of encapsulation blocks 20 operatively connects with second and third terminals 52B, 52C of the streaming cross bar 50 via the streaming-in and streaming-out connections 36, 40 of the pacing control networks 30 associated with the second and third encapsulation blocks 20B, 20C. Additionally, the set of encapsulation blocks 20 may also have a finite desired number of encapsulation blocks 20N operatively connected with a finite number of terminals 52N of the streaming cross bar 50. Any suitable number of encapsulation blocks may be operatively connected with a streaming cross bar based on various considerations, including the size and capacity of a streaming cross bar, the number of encapsulation blocks for a specific application, and other various considerations of the like.

The streaming cross bar 50 described herein is provided with a streaming protocol that matches the streaming protocol of the set of encapsulation blocks 20. In particular, the set of encapsulation blocks 20 and the streaming cross bar 50 are provided with matching DIDO streaming protocols. More specifically, the set of encapsulation blocks 20 and the streaming cross bar 50 are provided with AXI streaming protocols. In other exemplary embodiments, any suitable streaming protocol may be provided with a set of encapsulation blocks and a streaming cross bar where the streaming protocol is the same on both the set of encapsulation blocks and the streaming cross bar.

The set of encapsulation blocks 20 and the streaming cross bar 50 may be provided on any suitable integrated circuit for specific and desired applications. In particular, the set of encapsulation blocks 20 and the streaming cross bar 50 is provided on an application-specific integrated circuit (hereinafter "ASIC") that is designed for a specific and permanent application (e.g., a specific kind of transmission protocol, computing device, and other applications of the like). In other exemplary embodiments, a set of encapsulation blocks and a streaming cross bar may be provided on a field-programmable gate array (hereinafter "FPGA") if so desired.

The connections between the set of encapsulation blocks 20 with the streaming cross bar 50 are considered advantageous at least because each encapsulation block 20A, 20B, 20C, 20N in the set of encapsulation block 20 is able to communication with one another in a non-sequential order via the streaming cross bar 50. In comparison to PRIOR ART DSP block series 10 described above, each DSP block 10 of the PRIOR ART DSP block series 10 is preconfigured in a permanent, sequential order when the PRIOR ART DSP block series 10 were built. With this system, the combination of the set of encapsulation blocks 20 with the streaming cross bar 50 enables each encapsulation block 20A, 20B, 20C, 20N to communicate with one another outside of the preconfigured, permanent sequential order. For example, the first encapsulation block 20A with the associated DSP block 21 (labeled DSP Block #1) may communicate with any one of the second, third, or finite number of encapsulation blocks 20B, 20C, 20N per a newly designed application. As such, each preconfigured DSP block 21 encapsulated in an associated encapsulation block 20 of the set of encapsulation blocks 20 may be leverage and repurposed for new applications desired by designers of these systems.

The connections between the set of encapsulation blocks 20 with the streaming cross bar 50 are also considered advantageous at least because the preconfigured DSP blocks 21 encapsulated in the set of encapsulation blocks 20 are fully modular and interchangeable in a new application as compared to the pre-set and preconfigured application constructed in the PRIOR ART DSP block series 10. The encapsulation blocks 20 enables a designer of these systems to reconfigure and interchange specific blocks in a desired sequential order via the streaming cross bar for a new and different application as compared to the previous application of these DSP blocks 21.

The modularity of these encapsulation blocks 20 is also considered advantageous at least because more than one designer of these systems is enabled to modify and/or reconfigure these encapsulation blocks 20 at various time periods. In other words, the modularity of these encapsulation blocks 20 enables more than one designer to modify and/or reconfigure these encapsulation blocks 20 simultaneously or at different work time periods without being hampered by designated security levels. In other words, the circuitry architectures of the preconfigured DSP blocks 21 with associated pacing control networks 30 allows designers to separate these DSP blocks 21 from one another where each DSP blocks 21 is independent from one another. For example, the first encapsulation block 20A may have a first security level per its logical application and the second encapsulation block 20B may have a second security level per its logical application. In this example, the second security level requires a designer with a higher security clearance to modify the second encapsulation block 20B as compared to the first security level of the first encapsulation block 20A. In contrast to the PRIOR ART DSP block series 10, the designers of the first and second encapsulation blocks 20A, 20B in the present disclosure may separately and independently work on the first and second encapsulation blocks 20A, 20B without the designer of the second encapsulation block 20B being dependent upon the designer of the first encapsulation block 20A. In other words, a first designer may design and/or manipulate the first encapsulation block 20A having a first security level at a first time of operation, and a second designer may design and/or manipulate the second encapsulation block 20B having a second security level at a second time of operation; in this example, the first time of operation is different than the second time of operation.

Having now described the combination of the set of encapsulation blocks 20 and the streaming cross bar 50, a method of using the modular encapsulation blocks 20 in combination with the streaming cross bar 50 is described in more detail below.

Upon operation, an input signal device sends at least one input signal to one of the encapsulation blocks in the set of encapsulation blocks 20. In this method of use, the input signal device may send the at least one input signal to the first encapsulation block 20A in the set of encapsulation blocks 20. Upon receiving the at least one input signal, the at least one input signal is provided in a first streaming protocol (e.g., AXI streaming protocol) prior to be inputted to the streaming-in gasket 34 of the first encapsulation block 20A. Once provided at the streaming-in gasket 34, the streaming-in gasket 34 is configured to morph and/or encapsulated the at least one input signal from the first streaming protocol into a second streaming protocol that is accepted by the DSP block 21 of the first encapsulation block 20A. Once morphed, the streaming-in gasket 34 outputs the at least one input signal to the DSP block 21 via the samples-in stream 22 (see FIG. 3).

Prior to morphing the at least one input signal from the first streaming protocol into the second streaming protocol, the streaming-in gasket 34 of the first encapsulation block 20A detects that the at least one input signal is available for the DSP block 21. This detection by the streaming-in gasket 34 is outputted to the pacing control block 32 of the first encapsulation block 20A via the first electrical connection W1. Once the detection is received by the pacing control block 32, the pacing control block 32 activates the input clock "Clk" of the DSP block 21 of the first encapsulation block 20A to the ON state. Upon this activation, the input clock "Clk" enables the DSP block 21 to analyze, modify, and/or extract the information in a given signal by carrying out logical operations and processing on the given signal. The input clock "Clk" of the DSP block 21 may remain in the ON state until the streaming-in gasket 34 no longer detects an input signal from the input signal device. As such, the input clock "Clk" of the DSP block 21 may be activated between the ON state and the OFF state during operation of the encapsulation block 20.

Upon outputting the at least one input signal to the DSP block 21, the DSP block 21 of the first encapsulation block 20A analyzes, modifies, and/or extracts the information of the at least one input signal by carrying out the preconfigured logical operations and processing on the at least one input signal. Upon completion of the preconfigured logical operations, the DSP block 21 outputs a set of data at predefined parameters (e.g., predefined latency and predefined decimation rate) from the at least one input signal to the streaming-out gasket 38 of the first encapsulation block 20A via the samples-out stream 26 of the first encapsulation block 20A. Once outputted by the DSP block 21, the streaming-out gasket 38 receives the set of data in the second streaming protocol. Upon receipt, the streaming-out gasket 38 morphs and reverts the set of data from the second streaming protocol to the first streaming protocol (e.g., AXI streaming protocol).

Upon the morphing of the set of data, the set of data is then outputted from the streaming-out gasket 38 to the streaming cross bar 50 via the streaming-out connection 40 of the first encapsulation block 20A. Per the designed application of the encapsulation blocks 20, the set of data may be outputted to any one of the encapsulation blocks 20B, 20C, 20N of the set of encapsulated block 20 operatively connected with streaming cross bar 50 in contrast to the PRIOR ART DSP block series described above. The streaming cross bar 50 may also output data processed by any one of the encapsulated blocks 20 to another component and/or device operatively connected with the streaming cross bar 50. Per the design, operations of inputting and outputting to and from various encapsulation blocks in the set of encapsulation blocks 20 may continue until data is no longer inputted from at least one input signal device.

As described herein, the use of "encapsulated data" or "encapsulation data" simply means that the pacing control network 30 morphs and/or converts data between a first streaming protocol and a second streaming protocol. As such, the pacing control network 30 is configured to morph and/or convert data (i.e., encapsulate data) prior to be inputted to the DSP block 21 and subsequent to the DSP block 21 for AXI streaming capabilities. Such encapsulated data may also be referenced as "gated data" where the pacing control network 30 still morphs and/or converts data between a first streaming protocol and a second streaming protocol during operation.

Figure 5:
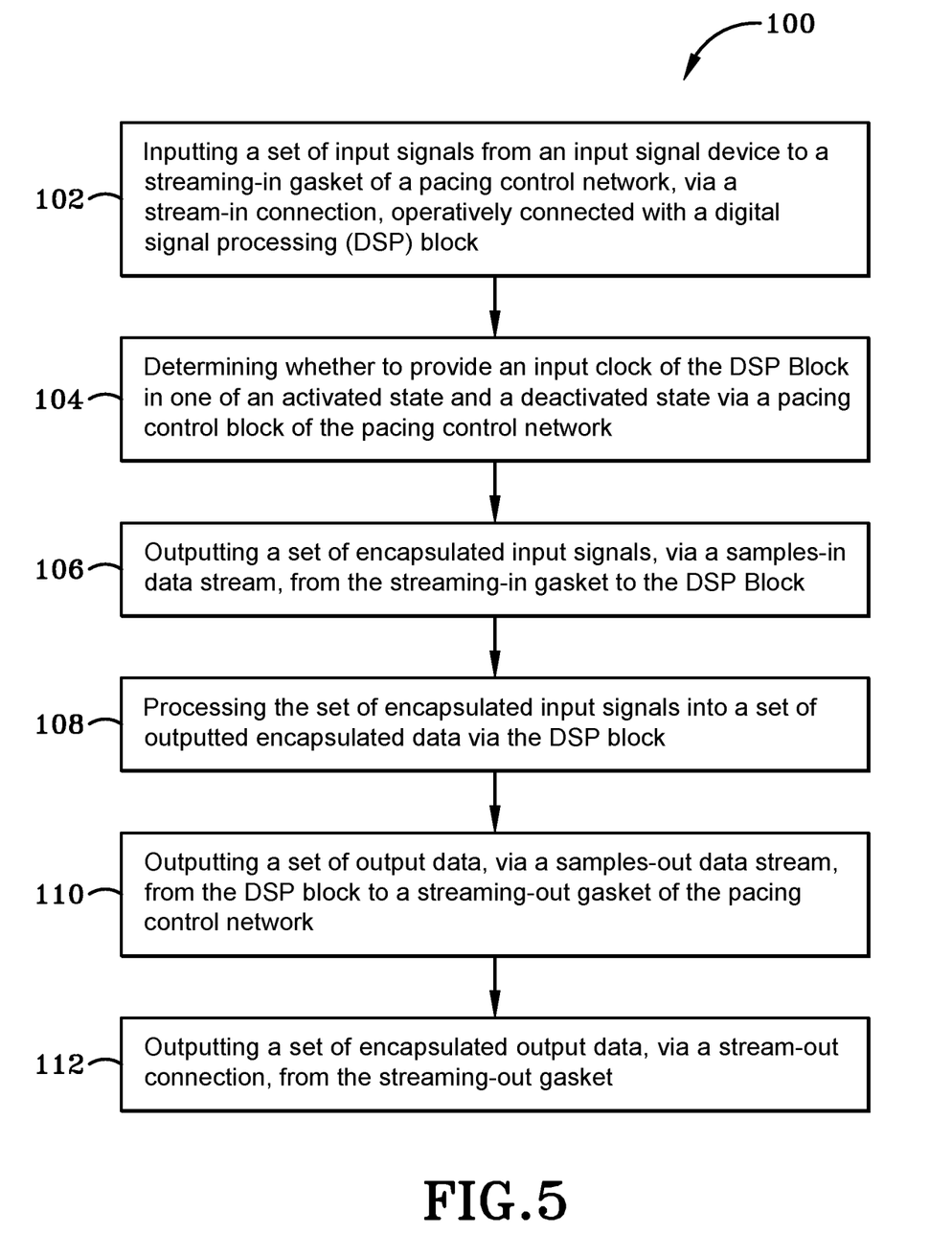
FIG. 5 is a flowchart of an exemplary method.

FIG. 5 illustrates a method 100. An initial step 102 of method 100 comprises inputting a set of input signals from an input signal device to a streaming-in gasket of a pacing control network, via a stream-in connection, operatively connected with a digital signal processing (DSP) block. Another step 104 of method 100 comprises determining whether to provide an input clock of the DSP Block in one of an activated state and a deactivated state via a pacing control block of the pacing control network. Another step 106 of method 100 comprises outputting a set of encapsulated input signals, via a samples-in connection, from the streaming-in gasket to the DSP Block. Another step 108 of method 100 comprises processing the set of encapsulated input signals into a set of outputted encapsulated data via the DSP block. Another step 110 of method 100 comprises outputting a set of output data, via a samples-out connection, from the DSP block to a streaming-out gasket of the pacing control network. Another step 112 of the method 100 outputting a set of encapsulated output data, via a stream-out connection, from the streaming-out gasket.

In other exemplary embodiments, method 100 may include additional and/or optional steps. An optional step may include setting the input clock of the DSP block to the activated state, via the pacing control block, when the set of input signals is available at the streaming-in gasket. An optional step may include setting the input clock of the DSP block to the deactivated state, via the pacing control block, when the set of input signals is unavailable at the streaming-in gasket. An optional step may include enabling operation of the pacing control network and the DSP block in response to a pacing parameter key logically inputted into the pacing control block. Optional steps may include morphing the set of input signals from a first protocol into the set of encapsulated input signals at a second protocol; and morphing the set of output data from the second protocol to the set of encapsulated output data to the first protocol; wherein the first protocol and the second protocol are different from one another. An optional step may include operatively connecting the pacing control network and the DSP block with a bus having an Advanced eXtenisble Interface (AXI) streaming protocol.

Figure 6:
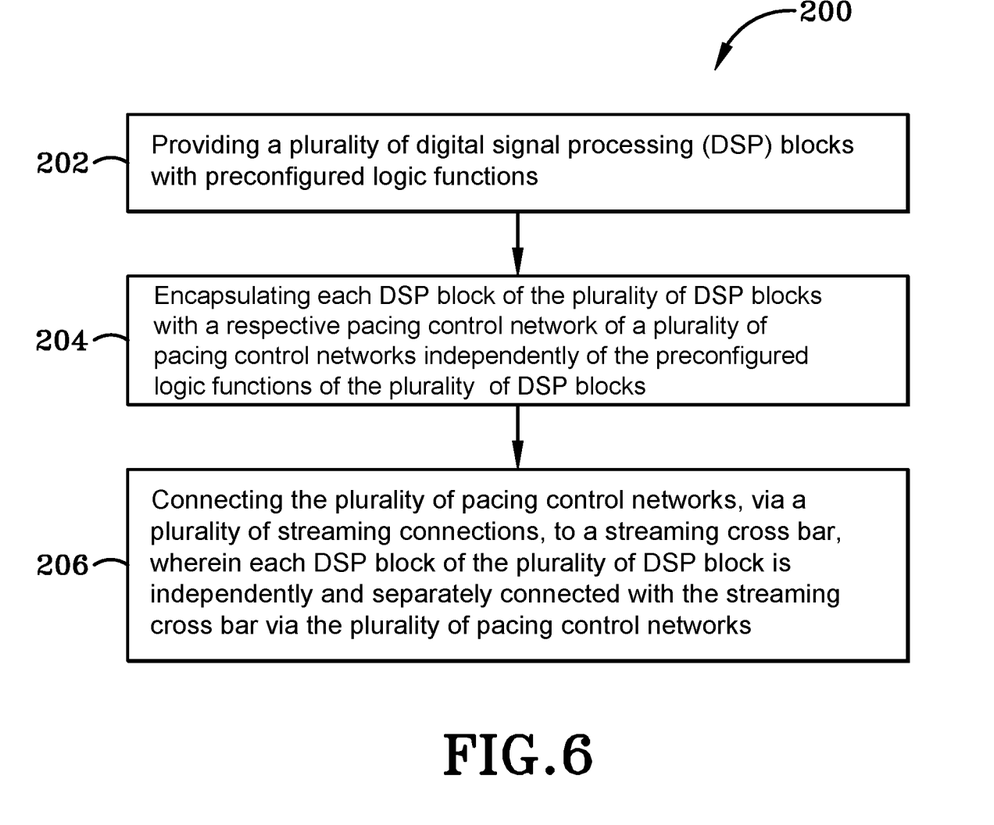
FIG. 6 is a flowchart of another exemplary method.

FIG. 6 illustrates a method 200. An initial step 202 of the method 200 comprises providing a plurality of digital signal processing (DSP) blocks with preconfigured logic functions. Another step 204 of the method 200 comprises encapsulating each DSP block of the plurality of DSP blocks with a respective pacing control network of a plurality of pacing control networks independently of the preconfigured logic functions of the plurality of DSP blocks. Another step 206 of the method 200 comprises connecting the plurality of pacing control networks, via a plurality of streaming connections, to a streaming cross bar, wherein each DSP block of the plurality of DSP block is independently and separately connected with the streaming cross bar via the plurality of pacing control networks.

In other exemplary embodiments, method 200 may include additional and/or optional steps. Optional steps may include effecting a first set of outputs to be sent, via at least one DSP block of the plurality of DSP blocks, over a first streaming connection of the plurality of streaming connections to the streaming cross bar; and effecting the first set of outputs to be received via at least another DSP block of the plurality of DSP blocks, wherein the at least one DSP block and the at least another DSP block is provided in a non-sequential order. Optional steps may include providing at least one DSP block of the plurality of DSP blocks with a first preconfigured logic function; providing at least another DSP block of the plurality of DSP blocks with a second preconfigured logic function different than the first preconfigured logic function; and enabling the at least one DSP block and the at least another DSP block to communication with one another via the plurality of pacing control networks and the streaming cross bar. Optional steps may include providing at least one DSP block of the plurality of DSP blocks with a first security level; and providing at least another DSP block of the plurality of DSP blocks with a second security level that is different than the first security level of the at least one DSP block, wherein the at least one DSP block and the at least another DSP block are adapted to be reconfigured separately and independently. An optional step may include enabling function, via a pacing parameter key, between a DSP block of the plurality of DSP blocks with a respective pacing function network of the plurality of pacing function networks. Optional steps may include effecting a set of input signals to be input from an input signal device to a first streaming-in gasket of a first pacing control block of the plurality of pacing control network, via a stream-in connection, operatively connected with a first DSP block of the plurality of DSP blocks; effecting to determine whether to provide an input clock of the first DSP Block in one of the ON state and the OFF state via the first pacing control block of the plurality of pacing control network; effecting a set of encapsulated input signals to be output, via a samples-in data stream, from the first streaming-in gasket to the first DSP Block; effecting the set of encapsulated input signals to be processed into a set of outputted encapsulated data via the first DSP block; effecting a set of output data to be output, via a samples-out data stream, from the first DSP block to a first streaming-out gasket of the first pacing control network; and effecting a set of encapsulated output data to be output, via a stream-out connection, from the first streaming-out gasket to a second DSP block of the plurality of DSP blocks. An optional step may include providing the plurality of DSP blocks, the plurality of pacing control networks, and the streaming cross bar on an application-specific integrated circuit (ASIC).

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system, comprising:
    a digital signal processing (DSP) block having an input terminal, an output terminal, and an input clock; and
    a pacing control network operatively connected with the input terminal, the output terminal, and the input clock of the DSP block, wherein the pacing control network comprises:
        a pacing control block operatively connected with the input terminal, the output terminal, and the input clock of the DSP block; and
        wherein the pacing control block is operable to control the input clock of the DSP block dependent upon input data being sent along the samples-in data stream
    wherein the input terminal of the DSP block is configured to receive a samples-in data stream inputted at a predefined clock period defined by the input clock;
    wherein the output terminal of the DSP block is configured to receive a samples-out data stream outputted at a predefined paced parameter;
    wherein the pacing control network is configured to control data flow at the samples-in data stream and the samples-out data stream independently of the DSP block; and
    wherein the pacing control network further comprises:
        a streaming-in gasket operatively connected with the pacing control block; and
        a stream-in connection operatively connected with the streaming-in gasket;
        wherein the streaming-in gasket is configured to transmit a signal indicative of whether data is being inputted from the stream-in connection.

2. The system of claim 1, wherein the pacing control network is adapted to set the input clock of the DSP block, via a data validation protocol, between an activated state and a deactivated state in response to data being available at the streaming-in gasket.

3. The system of claim 2, wherein when data is available at the streaming-in gasket, the pacing control network sets the input clock of the DSP block at the activated stated.

4. The system of claim 2, wherein when data is unavailable at the streaming-in gasket, the pacing control network sets the input clock of the DSP block at the deactivated stated.

5. The system of claim 1, wherein the pacing control network enables operation of the DSP block in response to receiving a pacing parameter key that matches with a predetermined pacing setting of the DSP block.

6. The system of claim 1, wherein the pacing control network further comprises:
    a streaming-out gasket operatively connected with the pacing control network; and
    a stream-out connection operatively connected with the streaming-out gasket and an output device.

7. The system of claim 6, wherein the streaming-in gasket is configured to receive a set of inputs provided in a first protocol via the streaming-in connection;
    wherein the DSP block is configured to receive a set of encapsulated inputs provided in a second protocol outputted from the streaming-in gasket via a samples-in connection;
    wherein the streaming-out gasket is configured to receive a set of output data provided in the second protocol outputted from the DSP block via a samples-out connection; and
    wherein an output device is configured to receive a set of encapsulated output data provided in the first protocol outputted from the streaming-out gasket via the stream-out connection;
    wherein the first protocol and the second protocol are different.

8. The system of claim 7, wherein each of the set of input and the set of outputs is receptive to a data-in-data-out streaming protocol.

9. The system of claim 8, wherein each of the set of inputs and the set of outputs is receptive to an Advanced extensible Interface (AXI) streaming protocol.

10. A method, comprising steps of:
inputting a set of input signals from an input signal device to a streaming-in gasket of a pacing control network, via a stream-in connection, operatively connected with a digital signal processing (DSP) block;
determining whether to provide an input clock of the DSP Block in one of an activated state and a deactivated state via a pacing control block of the pacing control network;
outputting a set of encapsulated input signals, via a samples-in connection, from the streaming-in gasket to the DSP Block;
processing the set of encapsulated input signals into a set of outputted encapsulated data via the DSP block;
outputting a set of output data, via a samples-out connection, from the DSP block to a streaming-out gasket of the pacing control network;
outputting a set of encapsulated output data, via a stream-out connection, from the streaming-out gasket;
morphing the set of input signals from a first protocol into the set of encapsulated input signals at a second protocol; and
morphing the set of output data from the second protocol to the set of encapsulated output data to the first protocol;
wherein the first protocol and the second protocol are different from one another.

11. The method of claim 10, further comprising:
setting the input clock of the DSP block to the activated state, via the pacing control block, when the set of input signals is available at the streaming-in gasket.

12. The method of claim 10, further comprising:
setting the input clock of the DSP block to the deactivated state, via the pacing control block, when the set of input signals is unavailable at the streaming-in gasket.

13. The method of claim 10, further comprising:
enabling operation of the pacing control network and the DSP block in response to a pacing parameter key logically inputted into the pacing control block.

14. The method of claim 10, further comprising: operatively connecting the pacing control network and the DSP block with a bus having an Advanced extensible Interface (AXI) streaming protocol.

15. An encapsulation block for a digital signal processing (DSP) block, comprising:
a streaming-in gasket operatively connected with an input terminal of a DSP block;
a streaming-out gasket operatively connected with an output terminal of the DSP block; and
a pacing control block operatively connected with the streaming-in gasket, the streaming-out gasket, and an input clock of a DSP block;
a stream-in connection operatively connected with the streaming-in gasket; and
a stream-out connection operatively connected with the streaming-out gasket; wherein the encapsulation block operatively connects with a bus having an Advanced extensible Interface (AXI) streaming protocol via the stream-in connection and the stream-out connection;
wherein the pacing control block is configured to control flow of data inputted into the DSP Block and outputted from the DSP block via the streaming-in gasket and the streaming-out gasket.

16. The encapsulation block of claim 15, wherein the pacing control block is configured to control the input clock of the DSP block based on availability of data in the streaming-in gasket.

* * * * *